United States Patent
Schadler

(10) Patent No.: US 9,707,894 B2
(45) Date of Patent: Jul. 18, 2017

(54) FOLDING DRIVE, EXTERIOR MIRROR AND FOLDING METHOD

(71) Applicant: MAGNA Auteca AG, Krottendorf bei Weiz (AT)

(72) Inventor: Bernhard Schadler, Oberrettenbach (AT)

(73) Assignee: MAGNA AUTECA AG, Krottendorf bei Weiz (AT)

( * ) Notice: Subject to any disclaimer, the term of this patent is extended or adjusted under 35 U.S.C. 154(b) by 0 days.

(21) Appl. No.: 15/061,123

(22) Filed: Mar. 4, 2016

(65) Prior Publication Data

US 2016/0288715 A1    Oct. 6, 2016

(30) Foreign Application Priority Data

Apr. 1, 2015 (DE) .................. 10 2015 205 923

(51) Int. Cl.
| | |
|---|---|
| G02B 7/18 | (2006.01) |
| B60R 1/078 | (2006.01) |
| B60R 1/074 | (2006.01) |
| F16C 19/10 | (2006.01) |
| F16C 33/38 | (2006.01) |

(52) U.S. Cl.
CPC .............. B60R 1/078 (2013.01); B60R 1/074 (2013.01); F16C 19/10 (2013.01); F16C 33/3862 (2013.01); F16C 33/3887 (2013.01)

(58) Field of Classification Search
CPC ......... B60R 1/074; B60R 1/078; F16C 19/10; F16C 33/3862; F16C 33/3887

USPC ........................................ 359/841, 872, 877
See application file for complete search history.

(56) References Cited

U.S. PATENT DOCUMENTS

| | | | |
|---|---|---|---|
| 2,173,508 A | 9/1939 | Horrocks | |
| 5,781,354 A * | 7/1998 | Sakata | B60R 1/074 359/872 |
| 2006/0238907 A1* | 10/2006 | Onuki | B60R 1/074 359/877 |

FOREIGN PATENT DOCUMENTS

| | | |
|---|---|---|
| DE | 19521432 A1 | 12/1996 |
| DE | 102006021249 B3 | 10/2007 |
| DE | 202009002540 U1 | 5/2009 |
| DE | 102009018224 A1 | 11/2010 |
| DE | 102013110638 A1 | 3/2015 |
| JP | 2008138736 A | 6/2008 |
| WO | 9743144 A1 | 11/1997 |

* cited by examiner

*Primary Examiner* — Euncha Cherry
(74) *Attorney, Agent, or Firm* — Jordan IP Law, LLC; Todd A. Vaughn

(57) ABSTRACT

A folding drive with an electric motor having a first component, a second component operatively connected to the first component for movement relative thereto, and an axial ball bearing arranged between the first component and the second component such that a rolling friction and a sliding friction are present in different percentage proportions depending on a direction of rotation of the axial ball bearing. The first component and the second component are rotatable relative to each other about a rotary axis which deviates from the vertical.

18 Claims, 6 Drawing Sheets

FOLDING DRIVE, EXTERIOR MIRROR AND FOLDING METHOD

CROSS-REFERENCE TO RELATED APPLICATIONS

The present application claims priority 35 U.S.C. §119 to German Patent Publication No. DE 102015205923.5 (filed on Apr. 1, 2015), which is hereby incorporated by reference in its entirety.

TECHNICAL FIELD

Embodiments relate to a folding drive with an electric motor, an exterior mirror using the folding drive, and a folding method. The folding drive includes a fixed component and a component moveable relative thereto, wherein the two components are rotatable relative to each other about a rotary axis deviating from the vertical.

BACKGROUND

The related art includes drive arrangements for rear-view mirrors of motor vehicles, which allow a mirror head carrying a mirror glass to be moved electrically between a usage position in which the mirror stands substantially at right angles to the vehicle centre axis, and a park position in which the mirror stands substantially parallel to the vehicle centre axis. A majority of drives use an electric motor which, via a two-stage worm gear, rotates the drive housing and a mirror head connected fixedly thereto about an output gear wheel connected to the mirror foot via a torque-limiting safety coupling.

Such an example is known from WO9743144A1 which discloses an electrically actuatable pivot device, a mirror housing (3) of an exterior mirror. The mirror housing can be moved manually from any position to another position, and returned from any position electrically by means of the pivot device to the normal operating position. The mechanism comprises a system of grooves and tabs in engagement therewith for establishing the end positions of the mirror housing.

Attention is increasingly directed at the noise behaviour of the drives. A noise which is different depending on direction may result due to deviations of the rotary axis from the vertical when the mirror head is turned obliquely upward on rotation into the park position, and hence the load on the mirror head is lifted up, and on rotation into the usage position pulls the weight of the mirror head down. To reduce the additional load from the oblique rotary axis, in some cases an axial ball bearing is fitted in the folding drive to reduce friction and hence relieve the load on the electric motor of the drive.

The disadvantage of existing solutions is that the axial ball bearing reduces friction independently of the fold direction of the mirror. So a different running noise is still perceived because of the different counter-moment on the electric motor depending on the direction of rotation. On unfolding, it can also occur that because of gravity, the mirror head advances faster than the gear and a jerky and noisy adjustment results.

SUMMARY

Embodiments relate to a folding drive which does not have the aforestated drawbacks.

In accordance with embodiments, a folding drive includes at least one of: an electric motor; a fixed component; a component moveable thereto; and an axial ball bearing arranged between the two components in which rolling friction and sliding friction are present in different percentage proportions depending on a direction of rotation, wherein the two components are rotatable relative to each other about a rotary axis deviating from the vertical.

In accordance with embodiments, a folding drive for an exterior mirror of a motor vehicle may include at least one of: a first component; a second component operatively connected to the first component for movement relative thereto; and an axial ball bearing arranged between the first component and the second component such that a rolling friction and a sliding friction are present in different percentage proportions depending on a direction of rotation of the axial ball bearing, wherein the first component and the second component are rotatable relative to each other about a rotary axis which deviates from the vertical.

In accordance with embodiments, an exterior mirror for a motor vehicle may include at least one of: a folding drive including a first component; a second component operatively connected to the first component for movement relative thereto; and an axial ball bearing arranged between the first component and the second component such that a rolling friction and a sliding friction are present in different percentage proportions depending on a direction of rotation of the axial ball bearing, wherein the first component and the second component are rotatable relative to each other about a rotary axis which deviates from the vertical.

In accordance with embodiments, an axial ball bearing arrangement is provided for at least partial compensation of torque differences on electric adjustment of a vehicle exterior mirror between a usage position and a park position. The fixed component may be connected to a mirror foot, and the moving component to a mirror head. The axial bearing arrangement has a different friction moment depending on direction of movement. For example, movement into a park position against gravity is facilitated by lower friction, and movement into the drive position in the direction of gravity is hindered by higher friction, so that direction-dependent noise differences are minimised and an accelerated advance of the mirror head can be prevented.

In accordance with embodiments, it is advantageous that the axial ball bearing includes a lower bearing shell, a bearing cage for receiving ball bearings, and an upper bearing shell. The pockets for the ball bearings are provided in the bearing cage, and are formed asymmetrical. Thus, the axial ball bearing may be configured depending on requirements.

In accordance with embodiments, it is advantageous that, in one direction of rotation of the axial ball bearing, the pockets each have a contact surface arranged perpendicular to the plane of the bearing shells, and in a second direction of rotation the pockets each have tongues which protrude into the pockets and which extend below the plane of the bearing cage. In this way, a greater or lesser division of the movement into a rolling and a sliding friction movement is achieved.

In accordance with embodiments, the lower bearing shell is advantageously formed as a V-shaped groove for receiving the tongues.

In accordance with embodiments, an exterior mirror with a folding drive is particularly suitable for being adjustable without running noise.

A method in accordance with embodiments is advantageously suitable for folding an exterior mirror about a rotary axis not arranged vertically, wherein an axial ball bearing is installed between the fixed and the moving components, and in one direction of rotation, the ball bearings of the axial ball bearing may roll and in the opposite direction of rotation they are prevented from rolling.

In accordance with embodiments, a method for folding an exterior mirror about a rotary axis not arranged vertically, the method including at last one of: arranging an axial ball bearing between a fixed component and a moving component of the exterior mirror such that that in one direction of rotation, the axial ball bearing is to roll, and in an opposite direction of rotation, the axial ball bearing is prevented from rolling.

In accordance with embodiments, it is advantageous that in one direction of rotation, the contact point of the ball bearings lies at a distance d from the ball centre (M), and in the opposite direction of rotation lies on the outer radius r.

DRAWINGS

Embodiments will be illustrated by way of example in the drawings and explained in the description below.

DESCRIPTION

Figure 1:
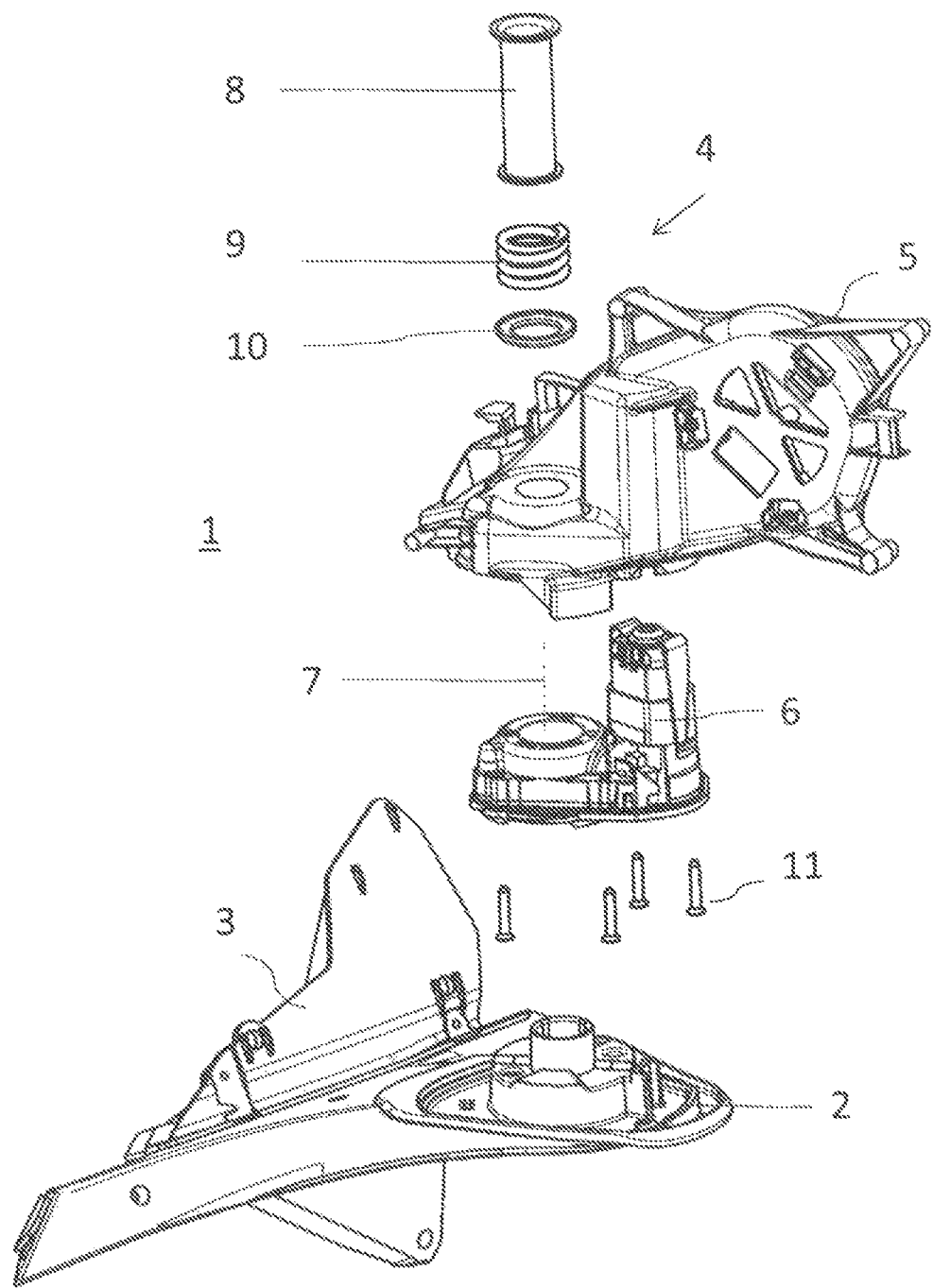
FIG. 1 illustrates an oblique view of an exploded depiction of a vehicle exterior mirror, in accordance with embodiments.

FIG. 1 illustrates an exploded view of a vehicle exterior mirror 1, in accordance with embodiments. A mirror foot 2 is fixedly connected to a vehicle body 3. A mirror head 4 includes of a mirror housing (not illustrated), the mechanism and the supporting parts. A carrier 5 is fixedly and operatively connected to an electric folding drive 6 which defines a rotary axis 7 7 for the rotary movement of the mirror head 4 relative to the mirror foot 2. The carrier 5 of the mirror head 5 and the mirror foot 2 are operatively connected to each other via a tubular rivet 8 and a strong compression spring 9. The folding drive 6 is suitable for holding the exterior mirror 1 between a usage position, and a position in which the exterior mirror 1 is moved into a park position approximately along the vehicle longitudinal axis. The rotary axis 7 of the rotatable mirror head, i.e. the carrier 5, lies in the vertical.

Figure 2:
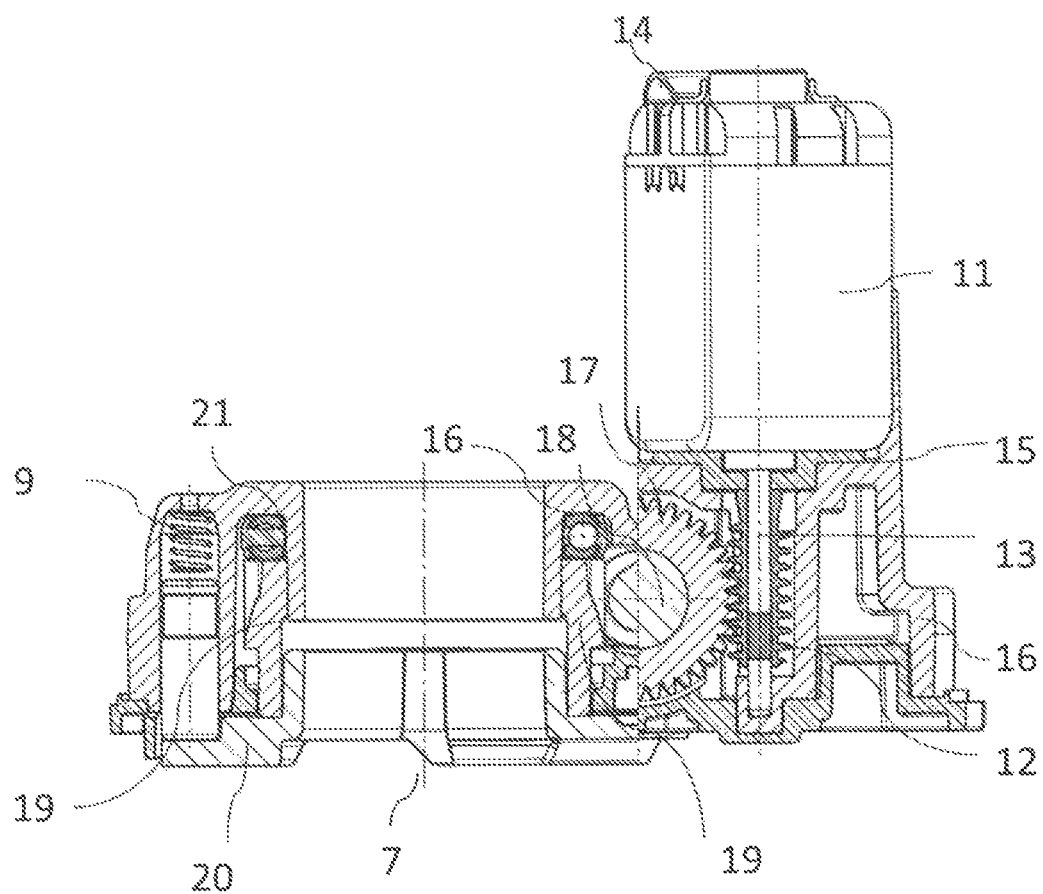
FIG. 2 illustrates a section view of an electric folding drive, in accordance with embodiments.

FIG. 2 illustrates a section through the electric folding drive 6, in accordance with embodiments. An electric motor 11 rotates a motor worm gear 12 mounted on a motor shaft 13. The electric motor 11 is pressed against a motor pressure plate 15 via a motor clamping bracket 14. The electric motor 11 is arranged in a motor housing 16 surrounded by the carrier 5 of the mirror head 4. Rotation of the electric motor 11 and the motor worm gear 12 are transmitted to an output gear wheel 19 by an intermediate shaft spur gear 17 and an intermediate shaft worm gear 18.

The output gear wheel 19 is fixedly and operatively connected to the mirror foot 2 via a locking plate 20. The output gear wheel 19 meshes with the intermediate shaft worm gear 18, in which the motor housing 16 is twisted relative to the output gear wheel 19.

To reduce the friction, an axial ball bearing 21 is arranged between the motor housing 16 and the output gear wheel 19. If the rotary axis 7 lies vertically, no particular precautions may be taken for the configuration of the axial ball bearing 21. This changes, however, as soon as the rotary axis 7 moves out of the vertical.

Figure 3:
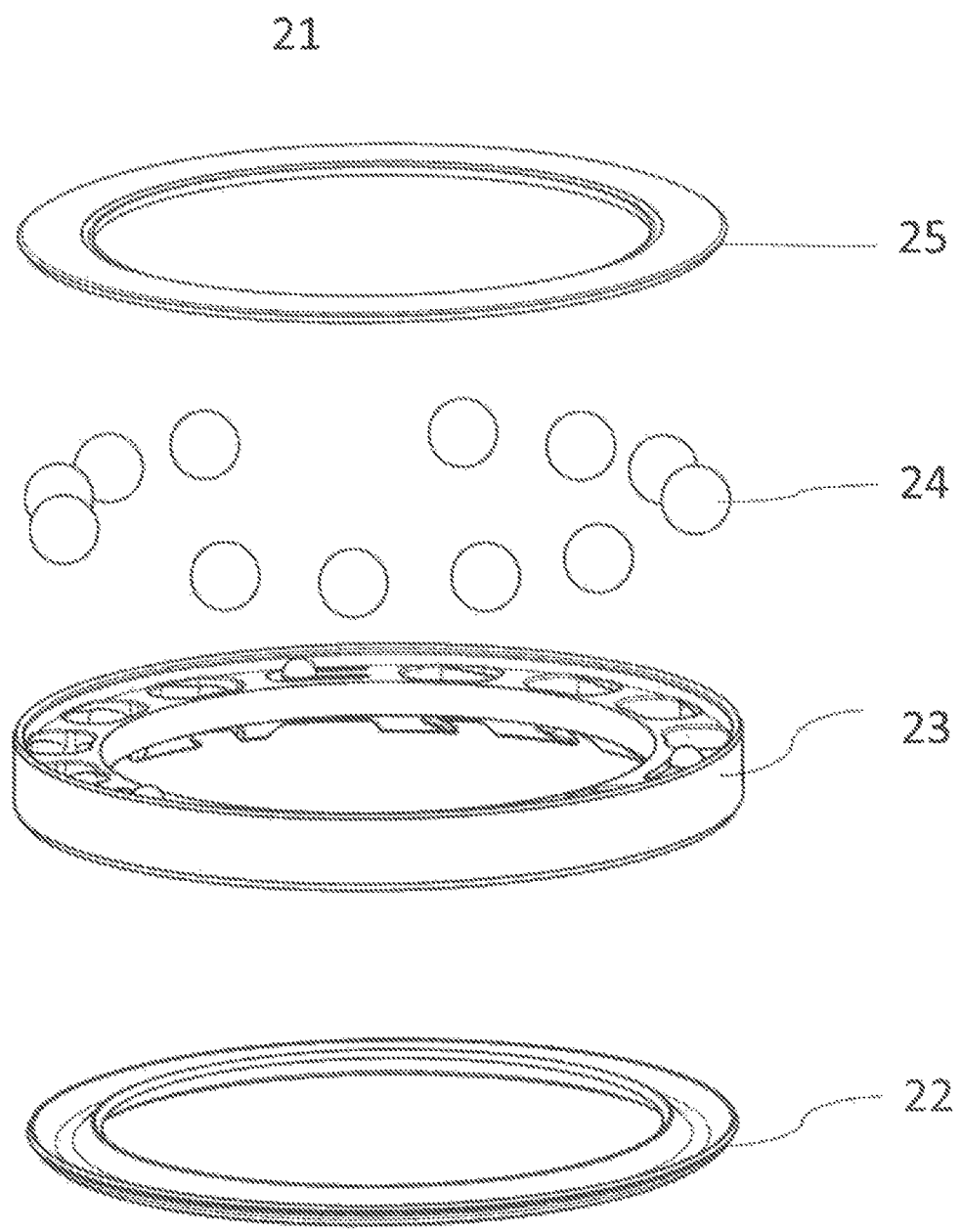
FIG. 3 illustrates an exploded view of an axial ball bearing, in accordance with embodiments.

FIG. 3 illustrates an exploded view of an axial ball bearing 21, in accordance with embodiments. The axial ball bearing 21 includes an upper bearing shell 25 and a lower bearing shell 22 which enclose a bearing cage 23 with ball bearings 24. For the further explanation of function, it is assumed that the lower bearing shell 22 is always stationary since it remains connected to the output gear wheel 19. The upper bearing shell 25 follows the rotary movement of the motor housing 16.

Figure 4:
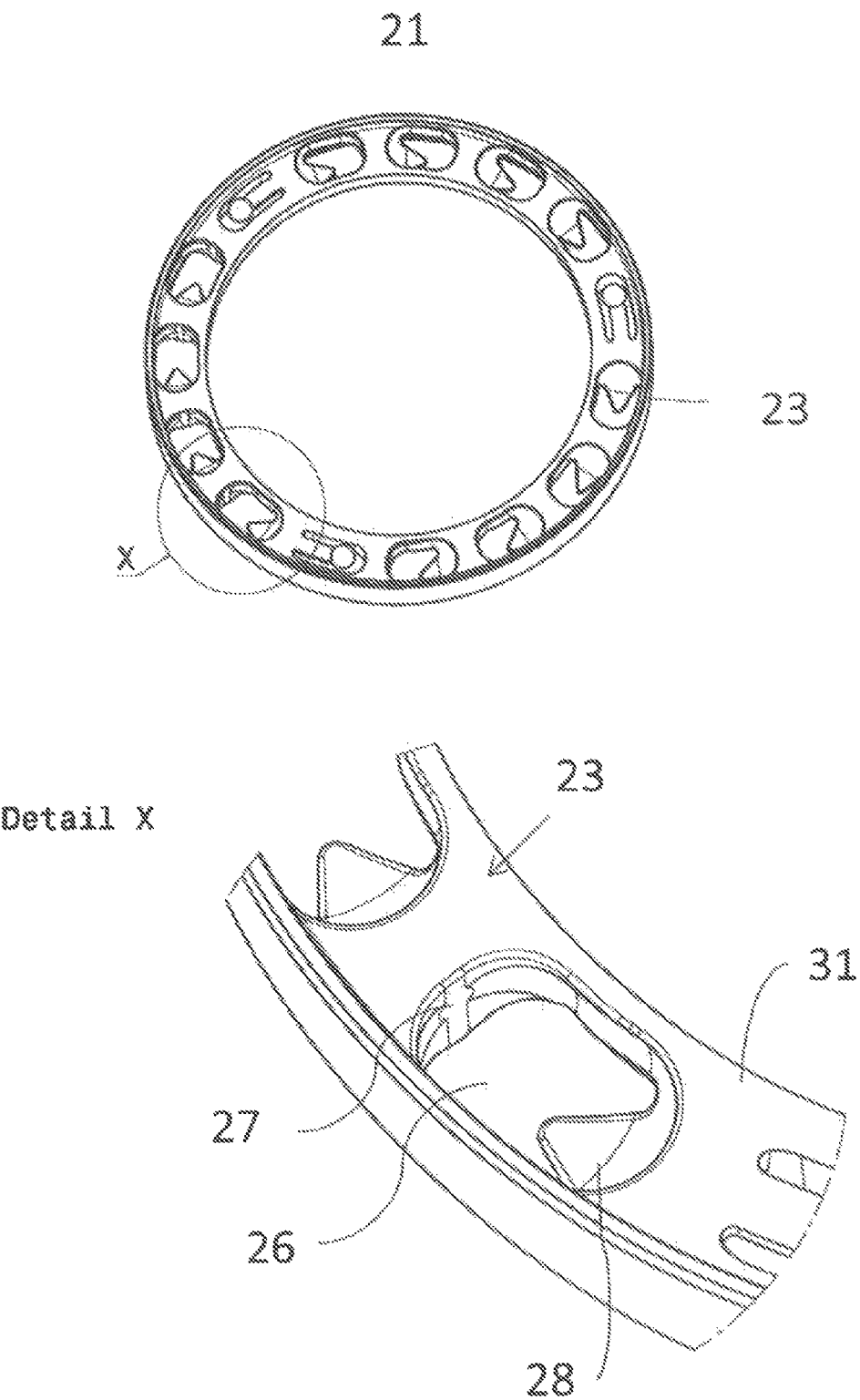
FIG. 4 illustrates an oblique view of the bearing cage with detail of the ball pocket, in accordance with embodiments.

FIG. 4 illustrates the bearing cage 23, in accordance with embodiments, with a detail view of pockets 26, each of which is sized to receive a respective one of the ball bearings 24. The pockets 26 for the ball bearings 24 extend along the periphery of the bearing cage 23. The pockets 26 constitute approximately bean-shaped recesses in the surface 31 of the bearing cage 23. A width is present in the middle of the bean-shaped pockets which corresponds to the diameter of the ball bearings. On one side thereof, the pocket 26 has a contact surface 27 arranged vertical to the plane of the bearing shells 22, 25 and the surface 31. On the other side thereof, the pocket 26 has a symmetrically arranged tongue 28 which reaches below a respective ball bearing 24.

Figure 5:
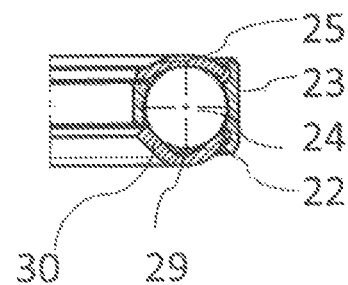
FIG. 5 illustrates views of the axial ball bearing, in accordance with embodiments.
Figure 5:
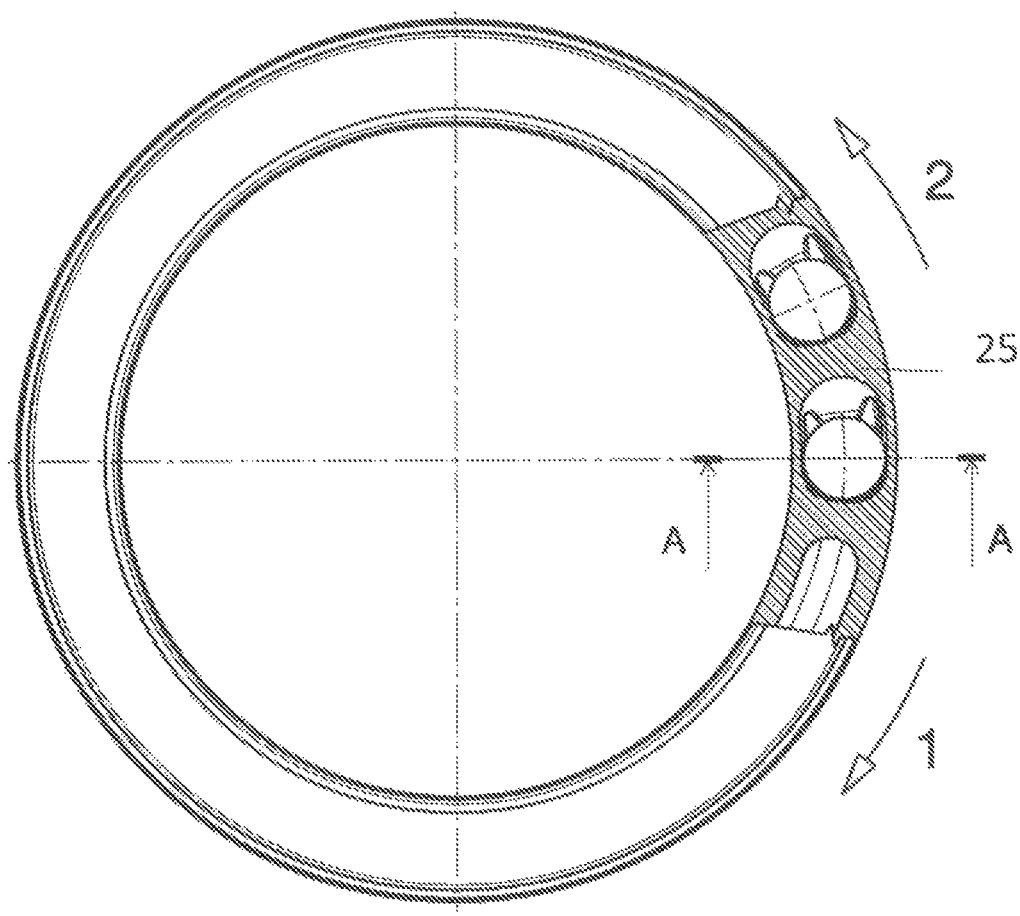

FIG. 5 illustrates the axial ball bearing 21 in a top view, in which part of the bearing 21 is shown broken away in order to reveal some ball bearings 24. The two directions of rotation, rotation direction 1 and rotation direction 2, are also illustrated. Furthermore, a section A-A is depicted in which the section axis is formed by the rotary axis of the bearing 21 and the centre point of a ball bearing 24. It is evident in the section view that the lower bearing shell 22 has a V-shaped cross section which allows the tongue 28 of the bearing cage 23 to reach under the ball. The ball 14 has contact points 30 to the side faces of the V-shaped groove 29.

Figure 6:
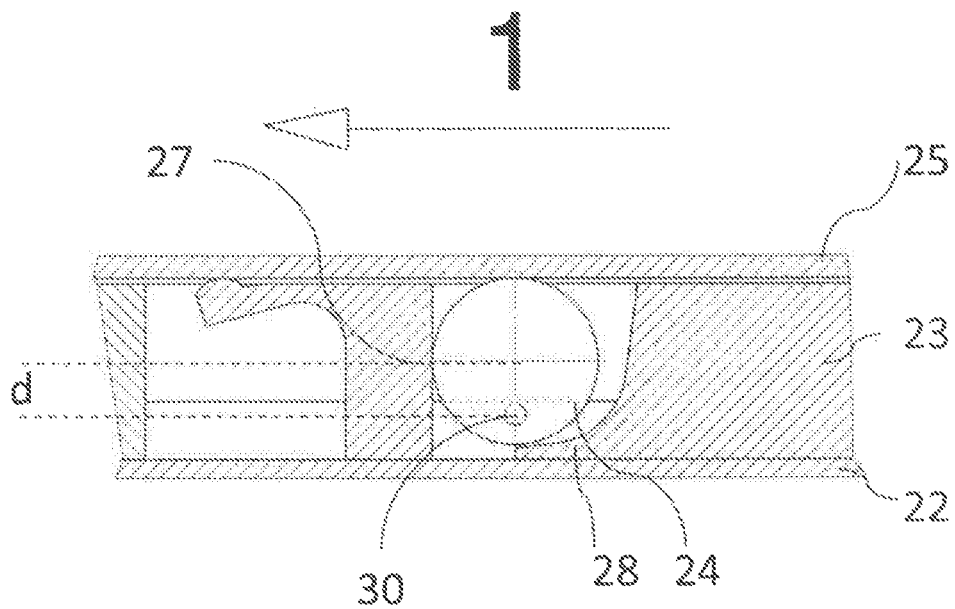
FIG. 6 illustrates a development along the ball track in rotation direction 1, in accordance with embodiments.

FIG. 6 illustrates a development in a running direction of the ball bearing 24 for the case of movement in rotation direction 1. The ball bearing 24 is set in rotation by the upper bearing shell 25 and rolls on the lower bearing shell 22. Here, it impacts on the vertical contact face 27 of the pocket 26 of the bearing cage 23, and pushes the bearing cage 23 with it in the direction of rotation, as in a conventional ball bearing. The ball bearing 24 is not in contact with the tongue 28 of the bearing cage 23, but rests on both sides of the V-shaped groove 29 of the lower bearing shell 22. The contact points are illustrated herein. They lie at a distance d from the ball centre point M. The axial force acting on the axial ball bearing 24 is thus transmitted directly to the lower bearing shell 22 via the ball bearings 24. In this direction of rotation, the ball bearing 24 has little friction, whereby the proportion of rolling friction is almost 100%.

Figure 7:
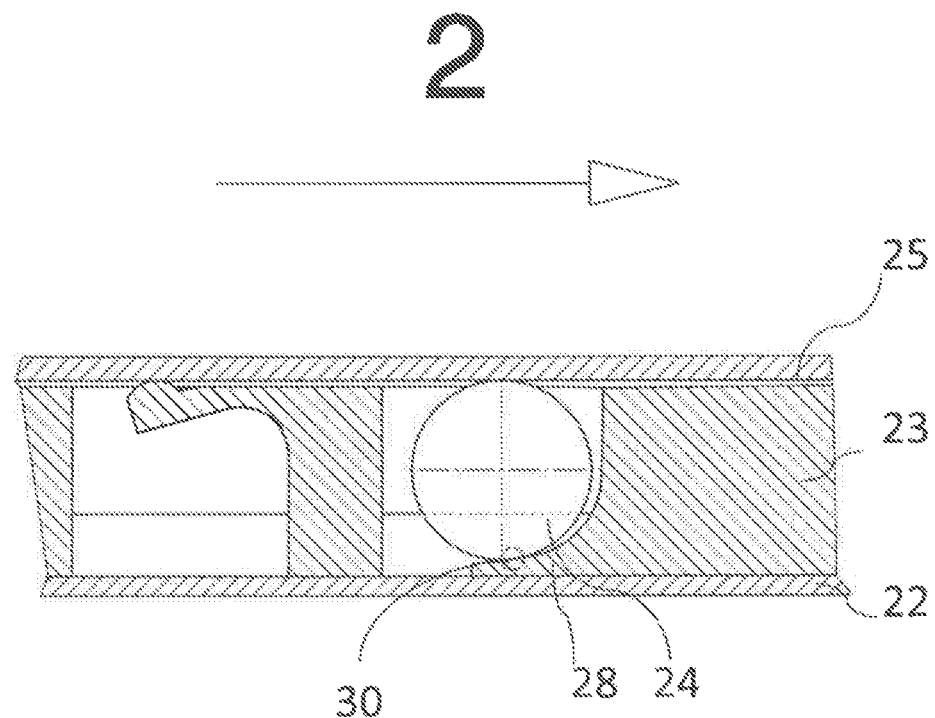
FIG. 7 illustrates a development along the ball track in rotation direction 2, in accordance with embodiments.

FIG. 7 illustrates a development in the running direction of the ball bearing 24 in the case of a movement in rotation direction 2. The ball bearing 24 is again set in rotation by the upper bearing shell 24 and rolls on the lower bearing shell 22. Then, however, the ball bearing 24 passes over the tongue 28 of the pocket 26 of the bearing cage 23. The contact point 30 shifts to the contact point with the tongue 28, and hence, to the outer radius of the ball bearing 24. The tongue 28 acts as a flat wedge and stresses the components of the ball bearing 24 in the axial direction. The ball bearings 24 are prevented from rolling and the bearing parts slide. In this direction of rotation, the ball bearing 24 has a high friction moment. The level of sliding friction is determined by the structural design of the tongue 28. The percentage of the rolling friction is thus reduced to a level which allows the movement inhibition to be structured such that the folding drive can still move harmoniously but is not accelerated by gravity. The directions in which a high friction moment or low friction moment are present may be exchanged, depending on how the ball bearing 24 is installed.

In accordance with embodiments, the entire description herein is based on a vertical rotary axis 7. Embodiments, however, are also naturally suitable for rotary axes of mirror movements which do not run vertically.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SIGNS

1 Vehicle exterior mirror
2 Mirror foot
3 Vehicle body
4 Mirror head
5 Carrier
6 Folding drive
7 Rotary axis
8 Tubular rivet
9 Compression spring
10 Slip plate
11 Electric motor
12 Motor worm gear
13 Motor shaft
14 Motor clamp bracket
15 Motor pressure plate
16 Motor housing
17 Intermediate shaft spur gear
18 Intermediate shaft worm gear
19 Output gear wheel
20 Locking plate
21 Axial ball bearing
22 Lower bearing shell
23 Bearing cage
24 Ball bearing
25 Upper bearing shell
26 Pocket
27 Contact face
28 Tongue
29 V-shaped groove
30 Contact point
31 Surface

What is claimed is:

1. A folding drive for an exterior mirror of a motor vehicle, the folding drive comprising:
    a first component;
    a second component operatively connected to the first component for movement relative thereto; and
    an axial ball bearing arranged between the first component and the second component such that a rolling friction and a sliding friction are present in different percentage proportions depending on a direction of rotation of the axial ball bearing, the axial ball bearing including a lower bearing shell, a bearing cage having pockets to receive ball bearings, and an upper bearing shell,
    wherein the first component and the second component are rotatable relative to each other about a rotary axis which deviates from the vertical.

2. The folding drive of claim 1, wherein that the first component is fixedly and operatively connected to a mirror foot.

3. The folding drive of claim 1, wherein that the second component is moveably and operatively connected to a mirror head.

4. The folding drive of claim 1, wherein that the pockets are formed symmetrically or asymmetrically.

5. The folding drive of claim 1, wherein, in one direction of rotation of the axial ball bearing, the pockets each have a contact face arranged perpendicular to a plane of the lower bearing shell and the upper bearing shell.

6. The folding drive of claim 1, wherein, in a second direction of rotation, the pockets have tongues which protrude therein and extend below a plane of the bearing cage.

7. The folding drive of claim 1, wherein that the lower bearing shell is formed as a V-shaped groove to receive the tongues.

8. The folding drive of claim 1, wherein:
    the first component comprises a gear wheel; and
    the second component comprises a motor.

9. An exterior mirror for a motor vehicle, comprising:
    a folding drive including:
        a first component;
        a second component operatively connected to the first component for movement relative thereto; and
        an axial ball bearing arranged between the first component and the second component such that a rolling friction and a sliding friction are present in different percentage proportions depending on a direction of rotation of the axial ball bearing, wherein the axial ball bearing includes a lower bearing shell, a bearing cage having pockets to receive ball bearings, and an upper bearing shell,
    wherein the first component and the second component are rotatable relative to each other about a rotary axis which deviates from the vertical.

10. The exterior mirror of claim 9, further comprising a mirror foot to which the first component is fixedly and operatively connected thereto.

11. The exterior mirror of claim 9, further comprising a mirror head to which the second component is moveably and operatively connected thereto.

12. The exterior mirror of claim 9, wherein that the pockets are formed symmetrically or asymmetrically.

13. The exterior mirror of claim 9, wherein, in one direction of rotation of the axial ball bearing, the pockets each have a contact face arranged perpendicular to a plane of the lower bearing shell and the upper bearing shell.

14. The exterior mirror of claim 9, wherein, in a second direction of rotation, the pockets have tongues which protrude therein and extend below a plane of the bearing cage.

15. The exterior mirror of claim 9, wherein that the lower bearing shell is formed as a V-shaped groove to receive the tongues.

16. The exterior mirror of claim 9, wherein:
the first component comprises a gear wheel; and
the second component comprises a motor.

17. A method for folding an exterior mirror about a rotary axis not arranged vertically, the method comprising:
arranging an axial ball bearing between a fixed component and a moving component of the exterior mirror such that a rolling friction and a sliding friction are present in different percentage proportions depending on a direction of rotation of the axial ball bearing, and such that in one direction of rotation, the axial ball bearing is to roll, and in an opposite direction of rotation, the axial ball bearing is prevented from rolling, wherein the axial ball bearing includes a lower bearing shell, a bearing cage having pockets to receive ball bearings, and an upper bearing shell.

18. The method of claim 17, wherein:
in the one direction of rotation, a contact point of the axial ball bearing lies at a distance from a center of the axial ball bearing; and
in the opposite direction of rotation, the contact point of the axial ball bearing lies on an outer radius of the axial ball bearing.

* * * * *